United States Patent
Baba et al.

(10) Patent No.: US 6,772,412 B2
(45) Date of Patent: Aug. 3, 2004

(54) DATA PROCESSING DEVICE EQUIPPED WITH A THREAD SWITCHING CIRCUIT

(75) Inventors: Yosuke Baba, Kyoto-fu (JP); Motoyuki Kato, Kyoto-fu (JP); Yasuhiro Nishimura, Kyoto-fu (JP); Hiroyuki Yanagi, Kyoto-fu (JP); Shiji Nakagawa, Kyoto-fu (JP)

(73) Assignee: Omron Corporation, Kyoto-fu (JP)

( * ) Notice: Subject to any disclaimer, the term of this patent is extended or adjusted under 35 U.S.C. 154(b) by 495 days.

(21) Appl. No.: 09/809,080

(22) Filed: Mar. 16, 2001

(65) Prior Publication Data

US 2002/0010733 A1 Jan. 24, 2002

(30) Foreign Application Priority Data

Mar. 16, 2000 (JP) .......................................... H12-073675

(51) Int. Cl.⁷ ................................................ G06F 9/44
(52) U.S. Cl. ........................ 717/131; 717/127; 712/228; 712/229
(58) Field of Search ................................. 717/127–128, 717/148–149; 712/226–232; 718/107–108

(56) References Cited

U.S. PATENT DOCUMENTS 5,815,727 A * 9/1998 Motomura ..................... 712/1
6,256,775 B1 * 7/2001 Flynn .......................... 717/127
6,295,600 B1 * 9/2001 Parady ......................... 712/228

* cited by examiner

Primary Examiner—Wei Zhen
Assistant Examiner—Ted T. Vo
(74) Attorney, Agent, or Firm—Dickstein Shapiro Morin & Oshinsky LLP (57) ABSTRACT

A device is provided with a control device that activates a stack machine and that also controls thread switching. This will reduce both the hardware requirements and the number of development processes needed to produce a switching control mechanism. It will also allow the threads to be switched very rapidly. The circuit to control thread switching: 1) discriminates a next thread to be switched to; 2) sidetracks the register data indicating the current state of execution of the program stored in the control register group in the stack machine in response to the request to switch threads and stores them in a sidetracking area set up for the current thread; and 3) reads the register data out of the sidetracking area for the thread that is switched to, which has been recognized by the discrimination unit, after the current data have been sidetracked by the sidetracking processor.

4 Claims, 6 Drawing Sheets

DATA PROCESSING DEVICE EQUIPPED WITH A THREAD SWITCHING CIRCUIT

FIELD OF THE INVENTION

This invention concerns a stack machine which switches between a number of programs (threads) it is executing while maintaining a work area for each one. More specifically, it concerns a technique to control how the stack machine switches from thread to thread.

BACKGROUND OF THE INVENTION

Programs written in java®, an object-oriented language developed by Sun Microsystems, are converted into byte code, so they operate in an environment with a Java interpreter rather than relying on a platform.

A computer with a control mechanism which can execute these Java byte codes (hereafter referred to as a "Java control mechanism") has a virtual machine called a "stack machine". This is used to execute a number of Java programs (or threads). A stack machine consists of a memory area (or stack) where a work area is set up for each thread and a control device (hereafter referred to as a "stack machine controller") which stacks work areas in this stack and executes each thread.

The aforesaid stack machine controller is actually a function in the computer's processor. A given number of registers in the processor are assigned to store the pointers indicating the status of the program, including the thread currently being executed and the location that has been reached in the thread's program. (Hereafter, these registers are referred to as the "control register group" and data stored in the control register group are referred to as "register data.")

The stack machine controller reads and writes data to and from the control register group and the thread work areas based on the results of executing the program in byte code. In this way it executes the program according to the thread which it has currently selected.

When the aforesaid stack machine controller is to switch between threads, it must sidetrack the current descriptive values in the aforesaid control register group, read out the previously sidetracked register data for the thread to which it is switching (for a newly activated thread, these will be the initial register data), and set these values in the control register group to change the status of the program.

The switching of threads is controlled by a program for that purpose. However, when this program is executed in a stack machine controller, difficulties arise in the processing which accompanies the execution of this program to change the descriptive values in the aforesaid control register group and sidetrack the data. In the prior art, a separate stack and control mechanism were used to execute a thread dedicated to the control of switching.

Figure 4:
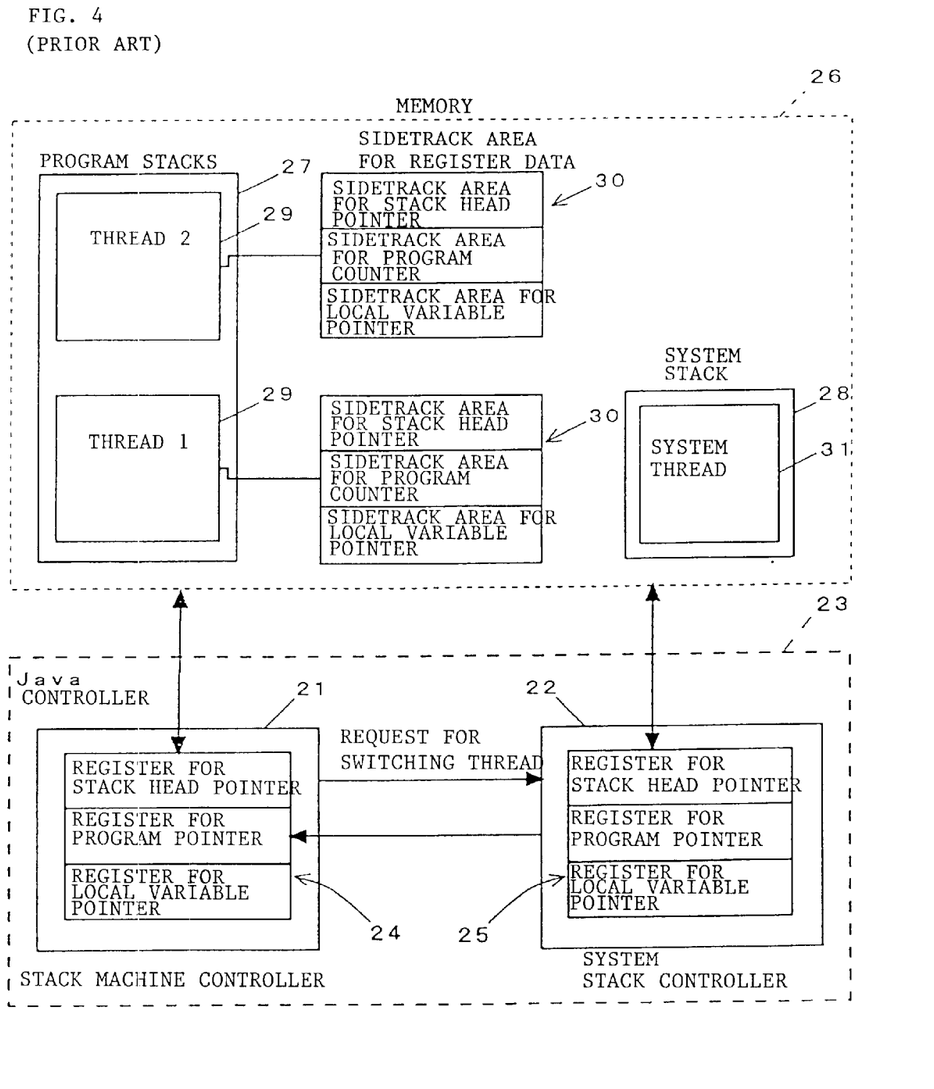
FIG. 4 shows a sample configuration for a data processing device according to a prior art.

FIG. 4 shows a prior art configuration for a data processing device with a stack machine.

In the figure, 21 is the aforesaid stack machine controller for processing multiple threads. 22 is the stack machine controller (hereafter referred to as the "system stack controller") to execute the thread (hereafter referred to as the "system thread") to control switching between the aforesaid threads. Both are in Java control mechanism 23, which has the function of executing byte code.

Each of controllers 21 and 22 has a control register group, 24 or 25, and a program logic circuit (not pictured) to manage the reading and writing of data from and to control register group 24 or 25. Register groups 24 and 25 each have a stack head pointer to indicate the location of the head of the stack to be controlled; a program counter to indicate the current location being executed in the program; and a local variable pointer to indicate the location where local variables used in each method are stored.

The program logic circuit in stack machine controller 21 has a discrimination circuit (not pictured) which recognizes when it is necessary to switch stacks and sends a "switch threads" request to system stack controller 22.

26 in the drawing is the memory (a RAM) in the data processing device. Two kinds of stacks (i.e., program stack 27 and system stack 28) are set up for the two controllers 21 and 22.

An individual work area 29 is set up in program stack 27 (i.e., the stack 27 for multiple thread processing) for each thread which is activated. (However, to simplify the illustration, work areas 29 are shown for only two threads, which are called thread 1 and thread 2.) System stack 28 has a work area 31 for the aforesaid system thread.

When programs are accessed to execute methods in threads, work areas (or frames) for those programs are stacked in thread work areas 29 and 31.

A sidetracking area 30 (hereafter, this sidetracking area is referred to as "sidetracking area 30 for register data") is set up in the thread work area 29 for each program stack. These areas 30 are used to sidetrack the register data from control register group 24 of the aforesaid stack machine controller 21 when switching to another register.

In FIG. 4, for the sake of convenience one set of sidetracking areas 30 is shown for each thread outside the block representing thread work area 29. Actually, sidetracking areas 30 are secured in thread work areas 29 in a specific location in each frame which is set up. And, although it is not shown in the illustration, a pointer (or memory location) to identify the frame of the method being executed in each thread (hereafter referred to as the "current frame pointer") is stored in each thread work area 29.

Figure 5:
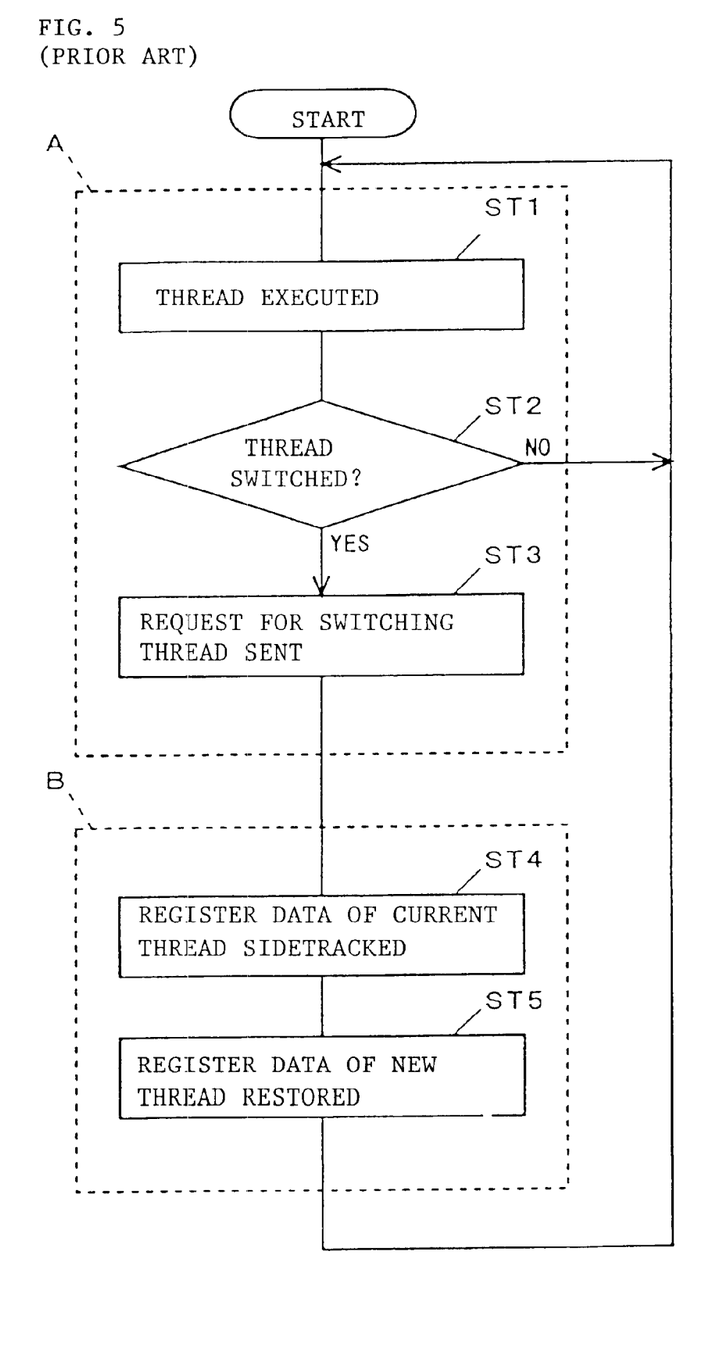
FIG. 5 shows the order of processing in a data processing device according to the prior art.

FIG. 5 shows the order of processing in a data processing device configured as described above. In the drawing, the box A drawn in dotted lines indicates the extent of the processing executed by stack machine controller 21; box B indicates the extent of the processing executed by system stack controller 22.

In the drawing, in Step 1, stack machine controller 21 reads and writes data into and 10 out of the work area 29 in program stack 27 for the current thread as well as into and out of internal control register group 24 as it executes the processing in that thread. When it recognizes that an event has occurred in the processing that requires another thread to be executed, we proceed from Step 2 to Step 3, and the controller sends a "switch threads" request to system stack controller 22.

When it receives the aforesaid "switch threads" request, system stack controller 22 executes the aforesaid system thread. It reads out the register data from control register group 24 in stack machine controller 21 and sidetracks them in the register data sidetracking area 30 for the current thread (in this case, the sidetracking area in the frame currently being accessed which is indicated by the aforesaid current frame pointer) (Step 4). In Step 5, controller 22 reads the register data for the thread it is switching to out of the sidetracking area 30 for the current frame in thread work area 29 and sets them in the control register group 24 for stack machine controller 21.

This switches the thread to the one that stack machine controller 21 must now execute. We go back to Step 1 and the new thread is executed.

Figure 6:
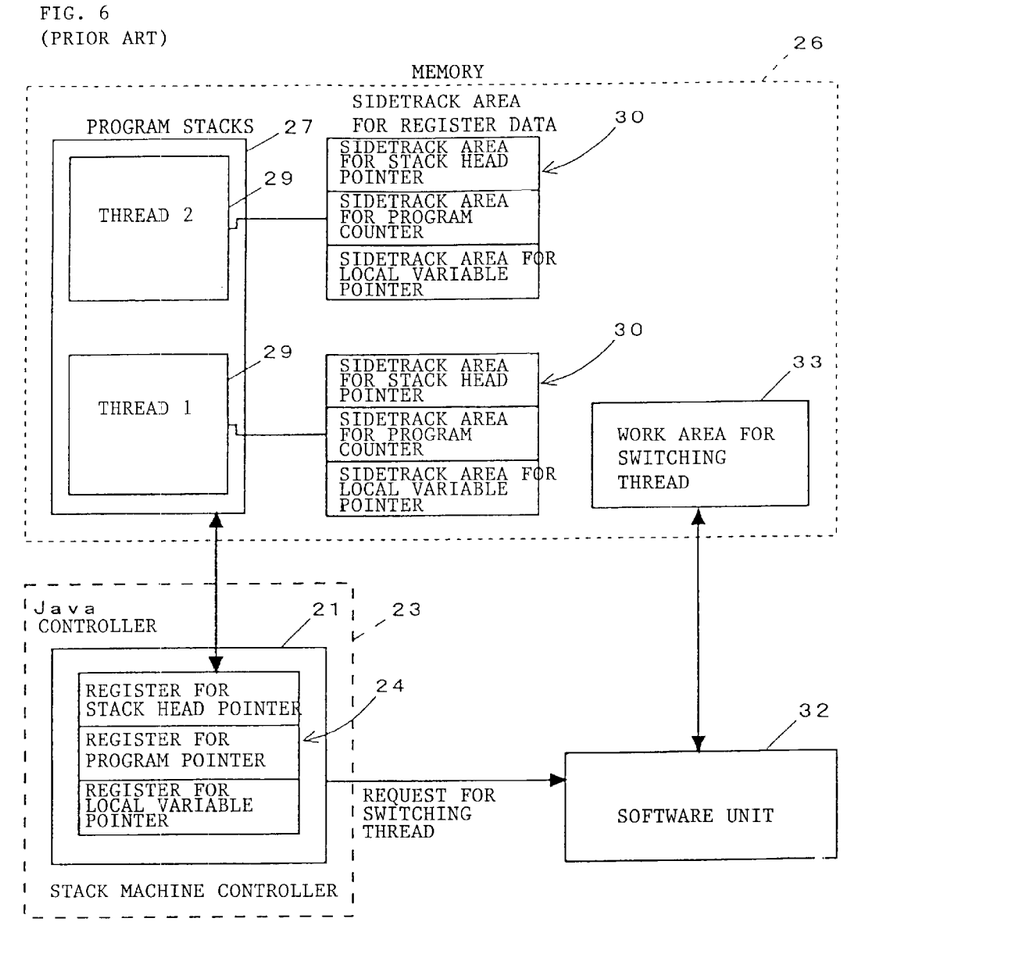
FIG. 6 shows a block diagram of a data processing device which controls the thread switching control by a software.

As is shown in FIG. 6, a software mechanism 32 in another program (for example, a program execution mechanism in C) which is outside of Java control mechanism 23 may be used instead of the aforesaid system stack controller to switch threads. Software execution mechanism 32 executes the aforesaid program to switch threads as it accesses work area 33 in memory 26. The processing it executes is the same as in the aforesaid FIG. 5B. In this way the thread is switched in response to a "switch threads" request from stack machine controller 22.

With the configuration in FIG. 4 to set up a system stack controller 22 to control switching, a separate control register group 25 must be created in system stack controller 22 to execute the system thread. This takes up a great deal of register space. A number of stacks must also be set up in memory 26, which requires substantial memory space.

With the configuration shown in FIG. 6, which uses a software mechanism 32 written in a different language, storage and work areas for the program must be set up in the memory to control the switching. This, too, takes up considerable memory space. Developing a program to control switching in another language also requires labor and a monetary investment.

If the thread switching is controlled by software, the result will be a longer processing time. In devices used for real-time processing, which require threads to be switched quickly in response to an event, introducing a system which requires so much time to process thread switching may be problematical.

SUMMARY OF THE INVENTION

This invention was developed in consideration of the problems outlined above. Its objective is to realize a device in which the control mechanism to activate the stack machine can itself control thread switching. This will reduce both the hardware requirements and the number of development processes needed to produce a switching control mechanism. It will also allow the threads to be switched very rapidly.

According to one aspect of the invention, a data processing device contains a stack machine which secures a separate work area for each of a number of threads and executes the various threads while switching between them. When the control mechanism which activates this stack machine receives a request to switch stacks from the stack machine, a control circuit in the device controls the thread switching in response to this request.

The aforesaid circuit to control thread switching has: a means to discriminate the thread which the aforesaid stack machine has requested it to switch to; a means to sidetrack the register data indicating the current state of execution of the program stored in the control register group in the aforesaid stack machine in response to the aforesaid request to switch threads and store them in a sidetracking area set up for the current thread; and a means to read the register data out of the sidetracking area for the thread that is switched to, which has been recognized by the means to discriminate that thread, after the current data have been sidetracked by the aforesaid sidetracking means.

The aforesaid control mechanism is a processor which functions in the environment of the program to activate the stack machine. If, for example, the stack machine executes threads described by a Java program, the control mechanism will be set up to have a programming environment in which an interpreter executes Java's byte code.

The stack machine controller is built into the aforesaid control mechanism. Any registers in the processor may be assigned as the control register group. The stack machine rewrites the control register group as needed as it accesses the work area for the current thread according to the data in the register group; in this way it executes the thread.

According to another aspect of the invention, the aforesaid stack machine has a register to store data needed to recognize the thread to be switched to. When new data are stored in this register as the program is executed, a request to switch threads is executed. In the aforesaid register, just as in the control register group, a specific register in the processor is assigned for this task.

According to another aspect of the invention, when new data to recognize a thread to be switched to are stored in the aforesaid register, the aforesaid stack machine sends those data along with the data to recognize the current thread to the control circuit. In this way a request to switch threads is issued.

According to another aspect of the invention, the circuit to control the aforesaid thread switching consists of programmable logic.

As the stack machine reads and writes data to and from its internal control register group, it executes a particular thread. If it becomes necessary to execute another thread while this thread is being executed, the stack machine sends a request to switch threads to the circuit to control thread switching in the control mechanism. In response to this request, the control circuit sidetracks the register data for the current thread which are in the control register group and stores them in a sidetracking area. In their place in the control register group, the control circuit stores the register data for the thread indicated by the aforesaid request to switch threads. In this way the thread which the stack machine is to execute is switched and the new thread is executed.

In a preferred embodiment of the invention, thread switching is controlled in the stack machine by a trigger, which is when data are stored in the register for data indicating the thread to be switched to. According to another aspect of the invention, the trigger for thread switching is when data are stored in the aforesaid register, but data to recognize the current thread in the aforesaid register and the new thread are sent from the stack machine to the circuit which controls thread switching. This control circuit recognizes the current thread and the new thread and executes the sidetracking and restoration of the register data.

According to another aspect of the invention, the circuit to control thread switching consists of programmable logic. This circuit can be realized as a miniature circuit which is built into the processor.

DETAILED DESCRIPTION OF THE INVENTION

Figure 1:
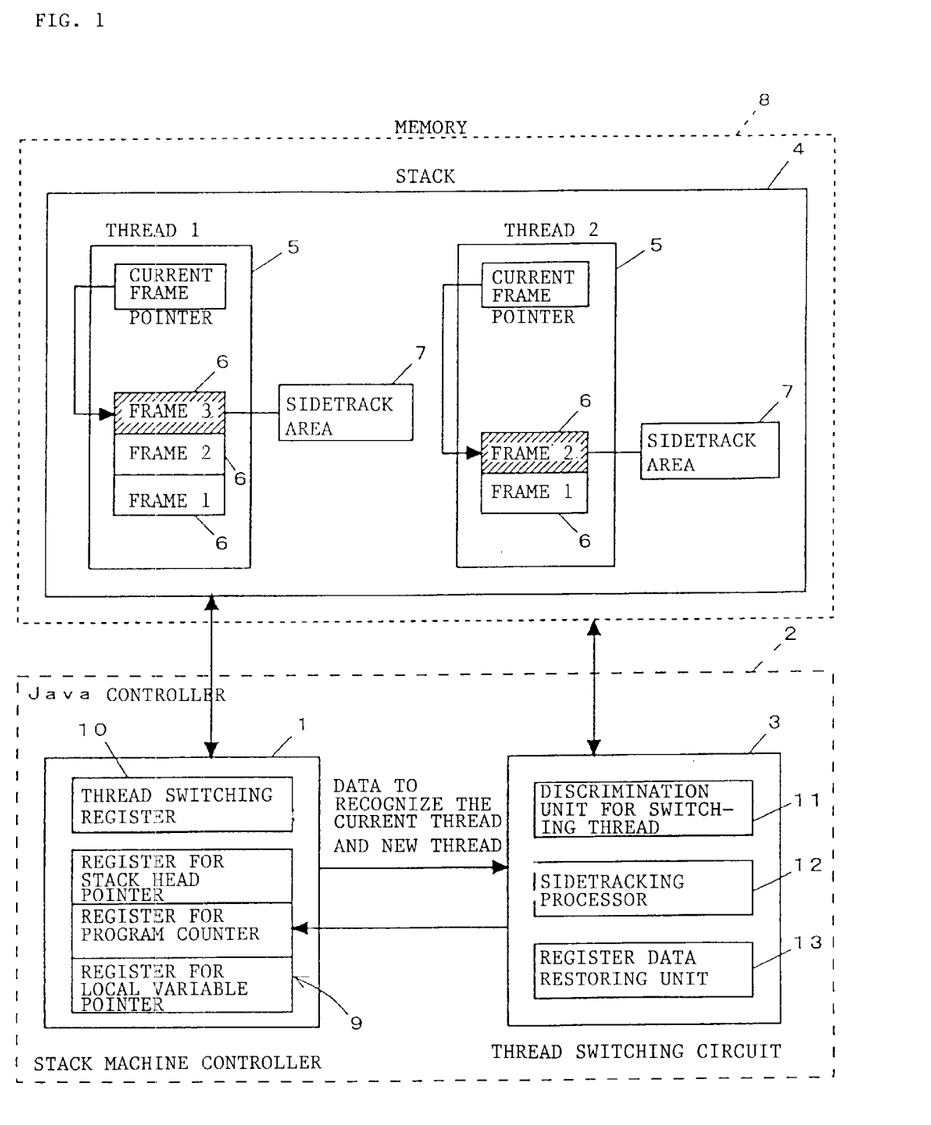
FIG. 1 shows a sample configuration for a data processing device in which this invention is implemented.

FIG. 1 shows a sample configuration for a data processing device in which this invention is implemented.

In the drawing, 1 is stack machine controller to execute a number of threads. It constitutes a portion of interpreter-type Java control mechanism 2. 4 is a stack in which a work area will be designated for each thread in the order that they are executed. These work areas are defined in a given location in memory 8 of the data processing device. These two components, stack machine controller 1 and stack 4, constitute a stack machine.

In addition to the aforesaid stack machine controller 1, the aforesaid Java control mechanism 2 has a mechanism (not pictured) to execute the byte code into which the Java source program has been converted and a circuit 3 to control the switching of the thread being executed by the aforesaid stack machine controller 1. Thread control device 3 consists of a programmable logic circuit which is built into a processor.

Stack machine controller 1 consists of a programmable logic circuit which manages the various registers and the reading and writing of register data. When needed, stack machine controller 1 sends a request to control circuit 3 asking it to control a thread switch. It also executes the byte code constituting the new thread. Controller 1 is thus a device to process multiple threads through the use of the aforesaid stack 4. A frame 6 for each method which is accessed is stacked in the work area 5 for each thread in stack 4. A current thread pointer to indicate the aforesaid current frame 6 is stored in a specific location in each thread.

In the example shown, as in the aforesaid FIGS. 4 and 6, work areas 5 are shown for only two threads, thread 1 and thread 2. The numerals 1, 2 and 3 are appended to the frames 6 in the work area 5 for each thread in the order those frames are secured.

As in the prior art, stack machine controller 1 has a control register group 9 to store various register data, such as the stack head pointer, the program counter and the local variable pointer. It also has another register, 10, to store data needed to recognize the new thread to be executed. The aforesaid programmable logic circuit has in it a discrimination circuit (not pictured) to recognize when there are new data in register 10 and send a "switch threads" request to the control circuit.

The data used to recognize a thread include an identification code given to each thread and the head address of the work area for the thread.

Figure 2:
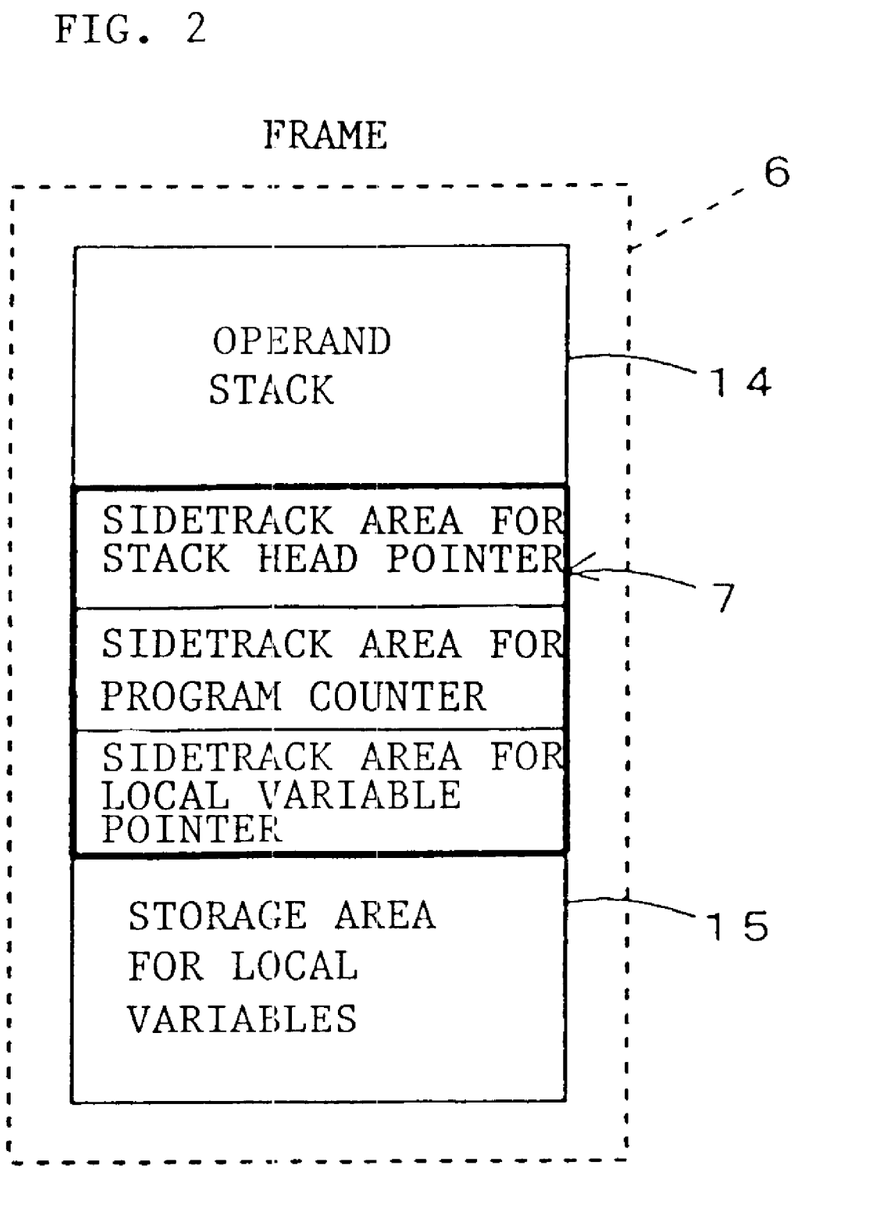
FIG. 2 shows a data structure in a frame.

As can be seen in FIG. 2, each frame 6 has, in addition to a sidetracking area 7 in which the register data in the aforesaid control register group 9 can be stored temporarily, an operand stack 14 to store the results of operations executed by the program and a storage area 15 for local variables used by methods.

The frames 6 in FIG. 1 which are shaded (frame 3 in stack 1 and frame 2 in stack 2) are the frames for the methods being executed by threads 1 and 2 (i.e., they are the current frames). The sidetracking areas 7 shown in the drawing are defined inside the current frames.

When the stack machine controller 1 of this embodiment must switch from its current thread to another, the data it needs to recognize the new thread are stored in register 10. The discrimination circuit in stack controller 1 is triggered when the recognition data are stored in the aforesaid register 10, and it sends the newly stored recognition data and those for the current thread to control circuit 3.

The aforesaid control unit 3 has a discrimination unit 11 to recognize when the threads need to be switched; a processing unit 12 to sidetrack the register data; and a processing unit 13 to restore the register data. Discrimination unit 11 receives the recognition data from the aforesaid stack machine controller 1 and discriminates the fact that a request to switch threads has been generated. From the content of the signal, it discriminates what the current thread and the new thread are.

When sidetracking processor 12 receives from the aforesaid discrimination unit 11 the data it needs to recognize the current thread, it reads the register data out of control register group 9 in the aforesaid stack machine controller 1. The processor 12 sidetracks these data in the work area 5 for the current thread. Processor 13 to restore the register data receives from discrimination unit 11 the data it needs to recognize the new thread. When it receives a signal indicating that processor 12 has completed its sidetracking processing, it reads out the register data that had been sidetracked in the work area 5 for the aforesaid new thread. It stores these data in control register group 9 in the stack machine controller.

The sidetracking of the aforesaid register data and the readout of the register data which are to be restored are both executed in the current frame for the thread in question.

Figure 3:
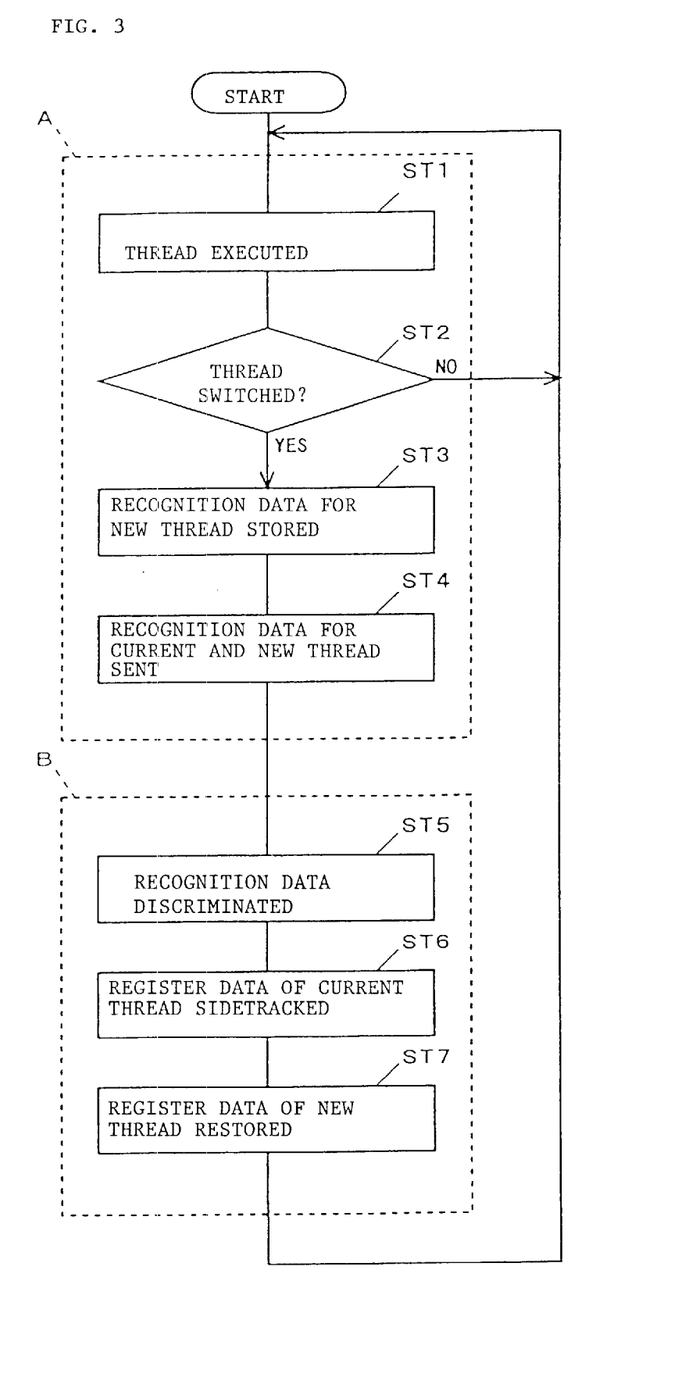
FIG. 3 shows the order of processing in a device configured as in the aforesaid FIG. 1.

FIG. 3 shows the order of processing in a device configured as in the aforesaid FIG. 1. Box A in the drawing shows the extent of the processing executed by stack machine controller 1, and Box B the extent of that executed by circuit 3 to control thread switching.

We shall next explain, with reference to the flow chart in FIG. 3, the order of processing used to switch from executing method 3 in thread 1 to executing method 2 in thread 2.

In Step 1, stack machine controller 1 reads and writes data, in work area 5 for the aforesaid thread 1, to and from internal control register group 9; operand stack 14 of the current frame, frame 3; and storage area 15 for local variables to execute method 3 of thread 1. If it becomes necessary to switch to thread 2 under these circumstances, we move from Step 2 to Step 3 and write the recognition data for the new thread, thread 2, in thread switching register 10.

In Step 4, when the recognition data are stored in the aforesaid thread switching register 10, the newly stored recognition data for thread 2 and those for the current thread, thread 1, are sent to control circuit 3.

In Step 5, control circuit 3 discriminates the recognition data it has been sent. In Step 6, it reads out the register data from control register group 9 in stack machine controller 1. The aforesaid register data which were just read out are sidetracked in sidetracking area 7 of the aforesaid frame 3 in work area 5 for the current thread, thread 1.

Control circuit 3 then accesses the work area 5 for thread 2, the thread indicated by the aforesaid recognition data. It obtains the current frame pointer in that area. Circuit 3 reads out of area 7 the register data that were sidetracked in the current frame as indicated by the pointer (in this case, frame 2). It stores these data in control register group 9 of stack machine controller 1 (Step 7).

Through this series of control steps, stack machine controller 1 switches from executing method 3 in thread 1 to executing method 2 in thread 2. When it has finished executing this method, if there is no request to switch threads again, it continues executing processing for thread 2.

If there is a request to switch back to thread 1 while thread 2 is being executed, Steps 1 through 7 are followed. The register data in control register group 9 are sidetracked in current frame 6 of thread 2, and the register data sidetracked in frame 3 of the aforesaid thread 1 are restored to control register group 9. Method 3 of thread 1 is recommenced.

With the configuration shown in the aforesaid FIG. 1, control circuit 3 to switch the threads, a programmable logic circuit, is built into Java control mechanism 2, which serves as the stack machine. There is thus no need for register or memory space to control thread switching, as there is in the configuration in FIG. 4, which has a system stack controller. This allows us to reduce the hardware to a more compact size.

Even when compared with the configuration in FIG. 6, which has a software mechanism in a different language, this design requires less memory for storage and work areas for the program, and it uses less hardware. Furthermore, the aforesaid control circuit 3 is realized as hardware in the form of a programmable logic circuit. In comparison with developing software to work with stack machine controller 1, this design requires much less labor and cost to develop.

Because register data can be sidetracked and restored quickly in response to a request to switch threads from a stack machine controller 1 which uses hardware processing, threads can be switched much more rapidly than they could in prior art schemes which relied on software processing.

With the configuration in the aforesaid FIG. 1, the stack machine is realized by an interpreter-type Java control mechanism. However, the program which operates the stack machine need not be limited to Java. Any program with a memory-use scheme like Java's, which sets up a work area for each of a number of programs, could make use of this invention.

As has been described above, the data processing device related to this invention has a built-in circuit in the stack machine control device to control thread switching. This allows the thread to be switched very rapidly, reduces the required register and memory capacity, and cuts down on hardware. Because it requires fewer development processes than would be required to write a program in another language to control switching, this design allows us to provide a data processing device with multi-thread processing capacity without increased labor or cost.

The thread will be switched rapidly by hardware processing in response to an event. This allows us to realize a data processing device well suited for use in equipment which requires real-time processing.

The entire disclosure of Japanese Patent Application No. H12-073675, filed Mar. 16, 2000, the entire disclosure of which is incorporated herein by reference.

What is claimed is:

1. A data processing device comprising:
 a stack machine which secures a separate work area for each of a number of threads and switches between said threads during thread execution; and
 a control device associated with said stack machine for activating said stack machine, said control device being provided with a thread switching control circuit to control said switching between said threads in response to a switching request from said stack machine, said thread switching control circuit comprising:
  a discriminator to discriminate a next thread to be switched to in response to said switching request from said stack machine;
  a sidetracking component to sidetrack a current register data indicating the current state data of execution of a program stored in a control register group in said stack machine in response to said switching request to switch threads, and store said current register data of execution in a sidetracking area set up in a current thread; and
  a unit to read registered data from a sidetracking area set up in said next thread discriminated by said discriminator, and store said read registered data in said control register group in said stack machine, after said current register data have been sidetracked by said sidetracking component;
 wherein said stack machine has a register to store a thread recognition data needed to recognize said next thread to be switched to, and output said switching request to switch to said next thread according to said newly stored data, said switching request is being output by sending a thread recognition data of said next thread and a thread recognition data of said current thread to said stack machine each time when said thread recognition data needed to recognize said next thread is stored.

2. A processing system comprising:
 a stack machine which reserves a separate memory area for data structures associated with each of a plurality of threads; and
 a control device associated with said stack machine for activating said stack machine, said control device being provided with a thread switching control circuit to control said switching between said threads in response to a switching request from said stack machine, said thread switching control circuit comprising:
  a discriminator to identify a next thread to be switched to in response to said switching request from said stack machine;
  a register state transfer section to store a current register data comprising current data in a register group in said stack machine in response to said switching request, said register state transfer section stores said current register data in a register data storage area in one of said data structures associated with an executing thread being switched; and
  a unit to read register data from a register data storage area of one of said data structures associated with said next thread selected by said discriminator, said unit further stores said read register data in said register group in said stack machine;
 wherein said stack machine has a register to store a thread recognition data needed to recognize said next thread to be switched to, said switching request comprises a thread recognition data of said next thread and a thread recognition data of said current thread.

3. A system of claim 2, wherein said switching request is sent each time when said thread recognition data needed to recognize said next thread is stored.

4. A system of claim 2, wherein said stack machine outputs said switching request to switch to said next thread according to newly stored said thread recognition data.

* * * * *